(12) United States Patent
Fujita et al.

(10) Patent No.: US 8,118,705 B2
(45) Date of Patent: Feb. 21, 2012

(54) VEHICLE CONTROL SYSTEM AND METHOD OF CONTROLLING VEHICLE

(75) Inventors: Hirofumi Fujita, Okazaki (JP); Kazuyuki Watanabe, Anjo (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 399 days.

(21) Appl. No.: 12/489,650

(22) Filed: Jun. 23, 2009

(65) Prior Publication Data

US 2009/0318262 A1 Dec. 24, 2009

(30) Foreign Application Priority Data

Jun. 24, 2008 (JP) .................................. 2008-164817
May 13, 2009 (JP) .................................. 2009-116818

(51) Int. Cl.
*F16H 61/48* (2006.01)
*B60W 10/06* (2006.01)
(52) U.S. Cl. .......................................... 477/54; 477/76
(58) Field of Classification Search .................... 477/54, 477/76, 83, 98
See application file for complete search history.

(56) References Cited

U.S. PATENT DOCUMENTS

| 6,843,752 | B2 * | 1/2005 | Bolander ........................ 477/54 |
| 2006/0293146 | A1 * | 12/2006 | Nakayashiki et al. ........... 477/76 |

FOREIGN PATENT DOCUMENTS

| JP | 07174216 | 7/1995 |
| JP | 09089098 | 3/1997 |
| JP | 10169764 A | 6/1998 |
| JP | 2002039361 | 2/2002 |
| JP | 2002235848 A | 8/2002 |
| JP | 2002364743 A | 12/2002 |
| JP | 2007205436 A | 8/2007 |

OTHER PUBLICATIONS

Japanese Office Action dated Jun. 23, 2011; 5 pgs.

* cited by examiner

*Primary Examiner* — Edwin A Young
(74) *Attorney, Agent, or Firm* — Gifford, Krass, Sprinkle, Anderson & Citkowski, P.C.

(57) ABSTRACT

A control system of a vehicle including an engine and an automatic transmission operable to form one of a plurality of gear positions set according to running conditions of the vehicle, and a method of controlling the vehicle are provided. In the control, the rotational speed of an input-side rotary shaft of a shifting mechanism of the transmission is detected, and the vehicle is controlled so that, when an execution condition that one of the gear positions set according to the running conditions is maintained and the rotational speed of the input-side rotary shaft has increased to be higher than a rotational speed corresponding to the set gear position is satisfied, the vehicle is brought into running conditions that will eliminate a state in which air is present in the hydraulic fluid supplied from an oil supply device.

14 Claims, 8 Drawing Sheets

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGED
× RELEASED
◎ ENGAGED DURING ENGINE BRAKING
△ ENGAGED ONLY WHEN DRIVING

VEHICLE CONTROL SYSTEM AND METHOD OF CONTROLLING VEHICLE

INCORPORATION BY REFERENCE

The disclosures of Japanese Patent Application No. 2008-164817 filed on Jun. 24, 2008 and Japanese Patent Application No. 2009-116818 filed on May 13, 2009, including the specifications, drawings and abstracts are incorporated herein by reference in their entirety.

BACKGROUND OF THE INVENTION

1. Field of the Invention

The invention relates to control of a vehicle on which an automatic transmission is installed, and in particular to control of the vehicle for eliminating a state in which air is present in a hydraulic fluid supplied into the automatic transmission when the hydraulic fluid has a low temperature.

2. Description of the Related Art

In an automatic transmission, a hydraulic fluid stored in an oil pan is sucked up by an oil pump through a strainer, and is supplied to each constituent component of the automatic transmission. In the automatic transmission of this type, if the suction amount of the hydraulic fluid through the strainer increases because the viscosity of the hydraulic fluid is high, or the engine speed is high, for example, the amount of the hydraulic fluid in the oil pan is reduced, and the strainer may be exposed to above the oil level, thus causing a problem that air is likely to be mixed into the hydraulic fluid when it is sucked through the strainer. Similarly, when the oil level of the hydraulic fluid in the oil pan changes due to the inertial force applied to the hydraulic fluid under certain running conditions of the vehicle, the strainer may be exposed to above the oil level, thus causing a problem that air is likely to be mixed into the hydraulic fluid when it is sucked through the strainer. If the hydraulic fluid that contains air is supplied to a friction device that is engaged so as to establish a gear position of the automatic transmission, a sufficiently high hydraulic pressure needed to engage the friction device cannot be supplied to the friction device, and slipping may occur in the friction device.

As one example of hydraulic control system for solving the problem as described above, a hydraulic control system for an automatic transmission as described in Japanese Patent Application Publication No. 7-174216 (JP-A-7-173216), for example, is arranged to prevent the engine from stalling due to uneven distribution of the oil in the oil pan upon abrupt braking. The hydraulic control system is employed in the automatic transmission having a torque converter equipped with a lock-up device capable of directly coupling an input element to an output element thereof, and includes a line pressure actuator for regulating a hydraulic oil pressure delivered from an oil pump of the automatic transmission so as to develop a line pressure, and a line pressure controller for controlling the operation of the line pressure actuator so as to form a line pressure corresponding to vehicle running conditions, based on input from a running condition detector. The hydraulic control system is characterized in that an exposed-state detector for detecting a state in which an inlet of the oil strainer provided on the inlet side of the oil pump is exposed to above the oil level, and that the line pressure controller executes control for increasing the line pressure while the state in which the inlet of the oil strainer is exposed to above the oil level is detected by the exposed-state detector.

With the hydraulic control system for the automatic transmission constructed as described above, even when the oil in the oil pan collects on one side during braking, and the inlet of the oil strainer is exposed to above the oil level, resulting in a reduction in the pressure delivered by the oil pump, the line pressure controller controls the operation of the line pressure actuator so as to increase the line pressure, so that the line pressure is not reduced as much as the delivery pressure of the oil pump. Accordingly, the release pressure supplied to the lock-up device so as to release the lock-up clutch of the torque converter in response to the braking action is kept at a higher level than the apply pressure, and the engine is prevented from stalling due to failed release of the lock-up clutch which would be otherwise caused by reduction of the release pressure.

In the hydraulic control system for the automatic transmission as described in the above-identified publication, however, the exposed-state detector needs to be provided for detecting the state in which the inlet of the strainer is exposed to above the oil level, resulting in an increase in the number of constituent components of the automatic transmission and increased cost.

SUMMARY OF THE INVENTION

The present invention provides vehicle control system and control method, which control the vehicle so as to eliminate a state in which air is present in hydraulic fluid in an automatic transmission, without requiring any additional constituent component.

A first aspect of the invention provides a control system of a vehicle as hereinafter described. The vehicle on which the control system is installed includes an engine, and an automatic transmission operable to establish a gear position selected from a plurality of gear positions, according to running conditions of the vehicle, by changing engaged or released states of friction devices using a hydraulic pressure supplied from a hydraulic pressure source. The automatic transmission includes a fluid coupling having an input shaft coupled to the engine and a shifting mechanism having an input shaft coupled to the fluid coupling. The hydraulic pressure source includes a reservoir in which a hydraulic fluid is stored, a supply device that supplies the hydraulic fluid stored in the reservoir to the friction devices, using power of the engine, and a flow path through which the hydraulic fluid stored in the reservoir flows into the supply device. The control system includes a rotational speed detector configured to detect a rotational speed of an input-side rotary shaft of the shifting mechanism, and a controller configured to control the vehicle so that, when an execution condition that a selected one of the plurality of gear positions set according to the running conditions of the vehicle is maintained, and the rotational speed of the input-side rotary shaft has increased to be higher than a rotational speed corresponding to the set gear position, is satisfied, the vehicle is brought from running conditions under which the execution condition is satisfied, into running conditions that will eliminate a state in which air is present in the hydraulic fluid supplied from the supply device.

When a gear position selected from a plurality of gear positions is established, the rotational speed of the input-side rotary shaft of the shifting mechanism changes along with a synchronous rotational speed corresponding to the established gear position as long as the selected gear position is not changed due to a change in the running conditions. Therefore, if a variation arises in the rotational speed of the input-side rotary shaft of the shifting mechanism in the above case, slipping may occur in a friction device or devices due to the presence of air in the hydraulic fluid. By controlling the vehicle so as to bring it from the running conditions under which the execution condition is satisfied, into the running conditions that will eliminate the state in which air is present in the hydraulic fluid supplied from the supply device (for example, so as to reduce the rotational speed of the input-side rotary shaft of the shifting mechanism), air is prevented from being contained in the hydraulic fluid, and slipping of the friction device(s) can be suppressed or prevented. Since it is not necessary to detect an exposed state of a reservoir-side end portion of the flow path, so as to carry out the above control, there is no need to add a new constituent component for this purpose. Thus, the control system of the vehicle is provided which eliminates the state in which air is present in the hydraulic fluid in the automatic transmission, without requiring any additional component.

In the control system as described above, the controller may control the vehicle so that the rotational speed of the input-side rotary shaft of the shifting mechanism is reduced to be lower than a rotational speed thereof detected when the execution condition is satisfied.

The controller of the control system as described just above controls the vehicle so that the rotational speed of the input-side rotary shaft of the shifting mechanism is reduced to be lower than the rotational speed detected when the execution condition is satisfied, whereby the amount of the hydraulic fluid supplied from the supply device can be reduced. As a result, the amount of the hydraulic fluid drawn from the reservoir by the supply device can be reduced. Therefore, the oil level of the hydraulic fluid in the reservoir is less likely to be lowered, and air is prevented from being contained in the hydraulic fluid in the automatic transmission.

In the control system as described above, the controller may control the automatic transmission so that the automatic transmission is shifted into a higher-speed gear position than the gear position established when the execution condition is satisfied.

With the control system as described above, the automatic transmission is controlled to be shifted into a higher-speed gear position than the gear position established when the execution condition is satisfied, so that the rotational speed of the input-side rotary shaft of the shifting mechanism can be reduced, and the amount of the hydraulic fluid supplied from the supply device can be reduced. Thus, the oil level of the hydraulic fluid in the reservoir is less likely to be lowered, and air is prevented from being contained in the hydraulic fluid in the automatic transmission.

In the control system as described above, the controller may control the engine so that output torque of the engine is reduced to be smaller than output torque detected when the execution condition is satisfied.

The controller of the control system as described above controls the engine so as to reduce the output torque of the engine to be smaller than the output torque detected when the execution condition is satisfied, so that the torque transmitted to the automatic transmission can be reduced. Therefore, the degree of slipping of the friction device(s) can be reduced. Owing to the reduction of the output torque, a surge in the input-side rotational speed of the shifting mechanism is suppressed or prevented, and the rotational speed is reduced. As a result, the amount of the hydraulic fluid supplied from the supply device can be reduced. Consequently, the oil level of the hydraulic fluid in the reservoir is less likely to be lowered, and air is prevented from being contained in the hydraulic fluid in the automatic transmission.

In the control system as described above, the execution condition may be a condition that the selected one of the plurality of gear positions set according to the running conditions of the vehicle is maintained, and the rotational speed of the input shaft of the shifting mechanism is higher by a predetermined value or greater than a synchronous rotational speed corresponding to the set gear position and a rotational speed of an output shaft of the shifting mechanism.

When the rotational speed of the input shaft of the shifting mechanism is higher by the predetermined value or greater than the synchronous speed corresponding to the set gear position, air may be contained in the hydraulic fluid, and slipping may occur in the friction device(s). In this case, the control system controls the vehicle so as to prevent air from being contained in the hydraulic fluid, thereby to suppress or prevent slipping of the friction device(s).

In the control system as described above, the execution condition may be a condition that the selected one of the plurality of gear positions set according to the running conditions of the vehicle is maintained, and the rotational speed of the engine is higher by a predetermined value or greater than a synchronous rotational speed corresponding to the set gear position and a rotational speed of an output shaft of the shifting mechanism.

When the engine speed is higher by the predetermined value or greater than the synchronous speed corresponding to the set gear position, air may be contained in the hydraulic fluid, and slipping may occur in the friction device(s). In this case, the control system controls the vehicle so as to prevent air from being contained in the hydraulic fluid, thereby to suppress or prevent slipping of the friction device(s).

The control system as described above may further include a temperature detector configured to detect a temperature of the hydraulic fluid in the automatic transmission. The controller of this control system may control the vehicle so that, when the execution condition is satisfied, and the temperature of the hydraulic fluid is equal to or lower than a predetermined temperature, the vehicle is brought into running conditions that will eliminate the state in which air is present in the hydraulic fluid supplied from the supply device.

When the hydraulic fluid has a low temperature and thus has a high viscosity, the hydraulic fluid supplied to the automatic transmission is less likely to return to the reservoir, and the oil level of the hydraulic fluid in the reservoir is more likely to be lowered, thus increasing the possibility of mixing of air into the hydraulic fluid. Therefore, when a condition that the temperature of the hydraulic fluid is equal to or lower than the predetermined temperature, in addition to the above-mentioned execution condition, is satisfied, the vehicle is controlled so as to eliminate the state in which air is present in the hydraulic fluid, thereby to suppress or prevent slipping of the friction device(s).

A second aspect of the invention provides a method of controlling a vehicle as hereinafter described. The vehicle controlled by this method includes an engine, and an automatic transmission operable to establish a gear position selected from a plurality of gear positions, according to running conditions of the vehicle, by changing engaged or released states of friction devices using a hydraulic pressure supplied from a hydraulic pressure source. The automatic transmission includes a fluid coupling having an input shaft coupled to the engine and a shifting mechanism having an input shaft coupled to the fluid coupling. The hydraulic pressure source includes a reservoir in which a hydraulic fluid is stored, a supply device that supplies the hydraulic fluid stored in the reservoir to the friction devices, using power of the engine, and a flow path through which the hydraulic fluid stored in the reservoir flows into the supply device. The control method includes the steps of: detecting a rotational speed of an input-side rotary shaft of the shifting mechanism, and controlling the vehicle so that, when an execution condition that a selected one of said plurality of gear positions set according to the running conditions of the vehicle is maintained, and the rotational speed of the input-side rotary shaft has increased to be higher than a rotational speed corresponding to the set gear position, is satisfied, the vehicle is brought from running conditions under which the execution condition is satisfied, into running conditions that will eliminate a state in which air is present in the hydraulic fluid supplied from the supply device.

The control method as described above makes it possible to eliminate the state in which air is present in the hydraulic fluid in the automatic transmission, without requiring any additional constituent component.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 3 is a view showing an operation table of the automatic transmission of the embodiment of FIG. 1;

DETAILED DESCRIPTION OF EMBODIMENTS

Figure 1:
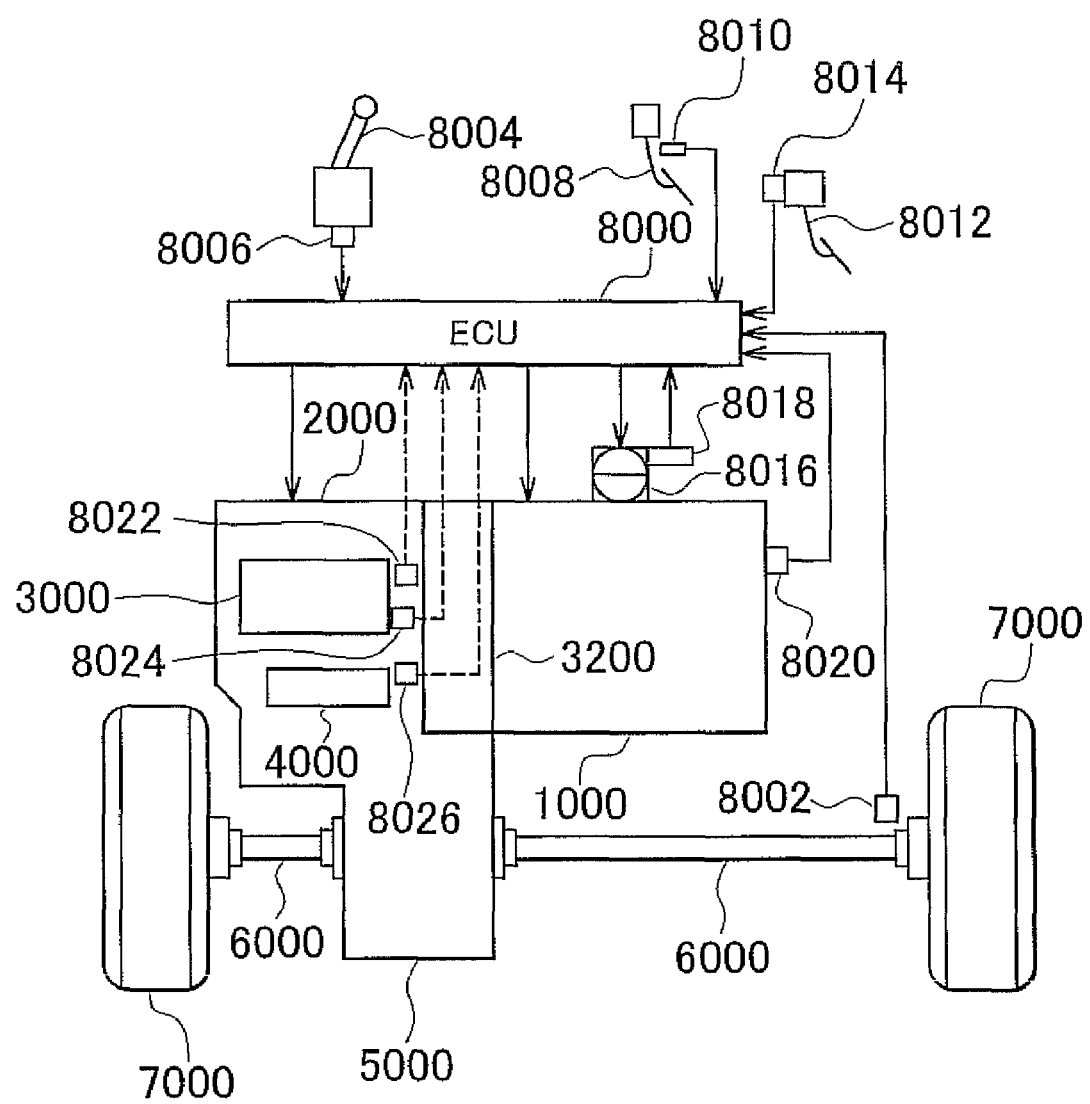
FIG. 1 is a schematic diagram showing a power train controlled by ECU as a control system according to one embodiment of the invention.

An embodiment of the invention will be described with reference to the drawings. In the following description, the same reference numerals are assigned to the same components, which are identified by the same names and have the same functions. Thus, detailed description of these components will not be repeated.

Referring to FIG. 1, the construction of a vehicle on which a vehicle control system according to one embodiment of the invention is installed will be described. The vehicle shown in FIG. 1 is a FF (Front-engine Front-drive) vehicle. The invention may be applied to vehicles other than the FF vehicle.

The vehicle includes an engine 1000, automatic transmission 2000, planetary gear unit 3000 that constitutes a part of the automatic transmission 2000, a hydraulic circuit 4000 that constitutes a part of the automatic transmission 2000, differential gear 5000, driveshafts or half shafts 6000, front wheels 7000, and ECU (Electronic Control Unit) 8000. The vehicle control system according to the invention is implemented by the ECU 8000.

The engine 1000 is an internal combustion engine operable to burn a mixture of fuel injected from an injector (not shown) and air, in a combustion chamber of each cylinder. The combustion of the air-fuel mixture causes a piston in the cylinder to be pushed down, so as to rotate a crankshaft.

The automatic transmission 2000 is connected to the engine 1000 via a torque converter 3200. The automatic transmission 2000 is placed in a desired gear position, so as to change the rotational speed of the crankshaft to a desired rotational speed.

An output gear of the automatic transmission 2000 is in mesh with the differential gear 5000. The driveshafts 6000 are coupled to the differential gear 5000 through engagement of splines, for example. Power is transmitted to left and right front wheels 7000 via the driveshafts 6000.

To the ECU 8000 are connected a vehicle speed sensor 8002, a position switch 8006 of a shift lever 8004, an acceleration stroke sensor 8010 of an accelerator pedal 8008, a stroke sensor 8014 of a brake pedal 8012, a throttle position sensor 8018 of an electronic throttle valve 8016, an engine speed sensor 8020, an input shaft speed sensor 8022, an output shaft speed sensor 8024, and an oil temperature sensor 8026, via wire harnesses, or the like.

The vehicle speed sensor 8002 detects the running speed of the vehicle from the rotational speed of the driveshafts 6000, and transmits a signal indicative of the result of the detection to the ECU 8000. The position switch 8006 detects the position of the shift lever 8004, and transmits a signal indicative of the result of the detection to the ECU 8000. The gear position of the automatic transmission 2000 is automatically established according to the position of the shift lever 8004. The automatic transmission 2000 may also operate in a manual shift mode according to the operation of the driver, so that the driver can select a certain gear position The acceleration stroke sensor 8010 detects the amount of depression of the accelerator pedal 8008, and transmits a signal indicative of the result of the detection to the ECU 8000. The stroke sensor 8014 detects the amount of depression or stroke of the brake pedal 8012, and transmits a signal indicative of the result of the detection to the ECU 8000.

The throttle position sensor 8018 detects the degree of opening of the electronic control valve 8016 whose opening is controlled by an actuator, and transmits a signal indicative of the result of the detection to the ECU 8000. The amount of air drawn into the engine 1000 (i.e., the output of the engine 1000) is controlled by the electronic throttle valve 8016.

The engine speed sensor 8020 detects the rotational speed of an output shaft (i.e., crankshaft) of the engine 1000, and transmits a signal indicative of the result of the detection to the ECU 8000. The input shaft speed sensor 8022 detects the rotational speed NT of an input shaft of the automatic transmission 2000 (which will also be called "turbine speed"), and transmits a signal indicative of the result of the detection to the ECU 8000. The output shaft speed sensor 8024 detects the rotational speed NO of an output shaft of the automatic transmission 2000, and transmits a signal indicative of the result of the detection to the ECU 8000.

The output shaft of the engine 1000 is coupled to an input shaft of the torque converter 3200, and an output shaft of the torque converter 3200 is coupled to an input shaft of the planetary gear unit 3000 as a shifting mechanism, so that the output shaft of the engine 1000 and the input shaft of the torque converter 3200 rotate at the same speed. Also, the input shaft of the automatic transmission 2000 and the output shaft of the torque converter 3200 rotate at the same speed.

The oil temperature sensor 8026 detects the temperature of hydraulic fluid in the automatic transmission 2000, and transmits a signal indicative of the result of the detection to the ECU 8000.

The ECU 800 controls devices or equipment so that the vehicle is brought into desired running conditions, based on signals received from the vehicle speed sensor 8002, position switch 8006, acceleration stroke sensor 8010, stroke sensor 8014, throttle position sensor 8018, engine speed sensor 8020, input shaft speed sensor 8022, output shaft speed sensor 8024, etc., and maps and programs stored in ROM (Read Only Memory).

In this embodiment, when the shift lever 8004 is placed in a D (DRIVE) position so that a D (DRIVE) range is selected as a shift range of the automatic transmission 2000, the ECU 8000 controls the automatic transmission 2000 so as to establish a selected one of first-speed through sixth-speed gear positions. The automatic transmission 2000 thus placed in the selected one of the first-speed through sixth-speed gear positions is operable to transmit driving force to the front wheels 7000.

When the shift lever 8004 is placed in a N (NEUTRAL) position so that a N (NEUTRAL) range is selected as a shift range of the automatic transmission 2000, the automatic transmission 2000 is controlled so as to establish a neutral condition (in which power transmission is cut off).

Figure 2:
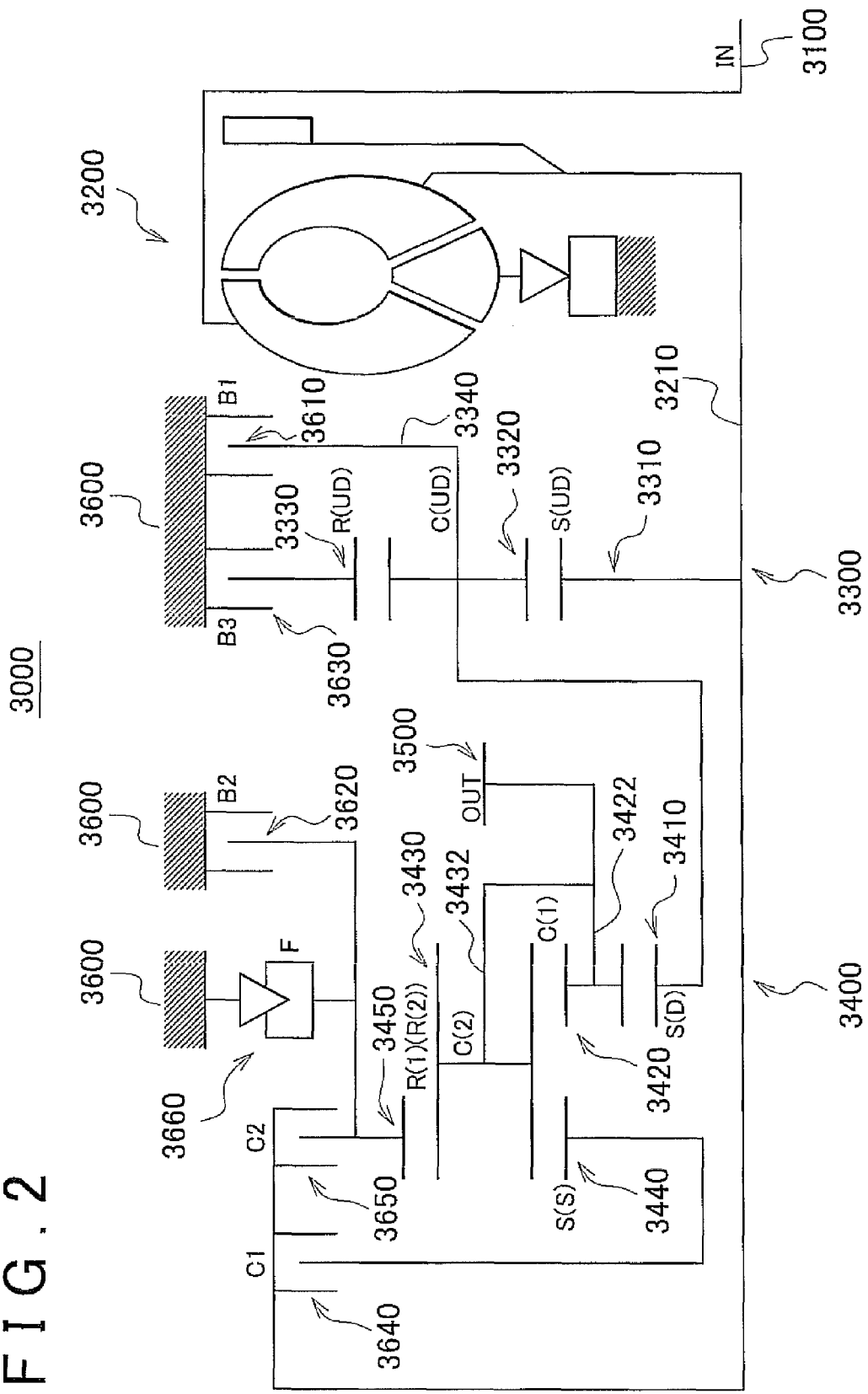
FIG. 2 is a skeleton diagram showing a gear train of an automatic transmission of the embodiment of FIG. 1.

Referring to FIG. 2, the planetary gear unit 3000 provided in the automatic transmission 2000 will be described. The planetary gear unit 3000 is connected to the torque converter 3200 having the input shaft 3100 coupled to the crankshaft. The planetary gear unit 3000 includes a first gear set 3300 in the form of a planetary gear mechanism, second gear set 3400 in the form of a planetary gear mechanism, output gear 3500, B1 brake 3610, B2 brake 3620 and B3 brake 3630 that are fixed to a gear case 3600, C1 clutch 3640 and C2 clutch 3650, and a one-way clutch F3660.

The first gear set 3300 is a single-pinion type planetary gear mechanism. The first gear set 3300 includes a sun gear S(UD) 3310, a pinion 3320, a ring gear R(UD) 3330, and a carrier C(UD) 3340.

The sun gear S(UD) 3310 is coupled to the output shaft 3210 of the torque converter 3200. The pinion is rotatably supported by the carrier C(UD) 3340. The pinion 3320 is in mesh with the sun gear S(UD) 3310 and the ring gear R(UD) 3330.

The ring gear R(UD) 3330 may be fixed to the gear case 3600 by the B3 brake 3630. The carrier C(UD) 3340 may be fixed to the gear case 3600 by the B1 brake 3610.

The second gear set 3400 is a Ravigneaux type planetary gear mechanism. The second gear set 3400 includes a sun gear S(D) 3410, a short pinion 3420, a carrier C(1) 3422, a long pinion 3430, a carrier C(2) 3432, a sun gear S(S) 3440, and a ring gear R(1) (R(2)) 3450.

The sung gear S(D) 3410 is coupled to the carrier C(UD) 3340 of the first gear set 3300. The short pinion 3420 is rotatably supported by the carrier C(1) 3422. The short pinion 3420 is in mesh with the sun gear S(D) 3410 and the long pinion 3430. The carrier C(1) 3422 is coupled to the output gear 3500.

The long pinion 3430 is rotatably supported by the carrier C(2) 3432. The long pinion 3430 is in mesh with the short pinion 3420, sun gear S(S) 3440 and the ring gear R(1) (R(2)) 3450. The carrier C(2) 3432 is coupled to the output gear 3500.

The sun gear S(S) 3440 may be coupled to the output shaft 3210 of the torque converter 3200 by the C1 clutch 3640. The ring gear R(1) (R(2)) 3450 may be fixed to the gear case 3600 by the B2 brake 3620, and may be coupled to the output shaft 3210 of the torque converter 3200 by the C2 clutch 3650.

Also, the ring gear R(1) (R(2)) 3450 is coupled to the one-way clutch F3660, and becomes unable to rotate when the vehicle is driven in first gear.

The one-way clutch F3660 is disposed in parallel with the B2 brake 3620. Namely, the outer race of the one-way clutch F3660 is fixed to the gear case 3600, and the inner race is coupled to the ring gear R(1) (R(2)) 3450 via a rotary shaft.

FIG. 3 is an operation table indicating the relationship between each gear position and an operating (engaged or released) state of each clutch element and each brake element. By actuating a combination of the brake element(s) and the clutch element(s) as indicated in the operation table, each of the first-speed through sixth-speed forward-drive gear positions and one reverse-drive gear position is established.

As shown in FIG. 3, the C1 clutch 3640 is engaged in all of the first-speed through fourth-speed gear positions. Thus, the C1 clutch 3640 may be called "input clutch" in the first-speed through fourth-speed gear positions. The C2 clutch 3650 is engaged in the fifth-speed and sixth-speed gear positions. Thus, the C2 clutch 3650 may be called "input clutch" in the fifth-speed and sixth-speed gear positions.

While the invention is applied to the automatic transmission having two input clutches in this embodiment, the number of input clutches is not particularly limited.

Figure 4:
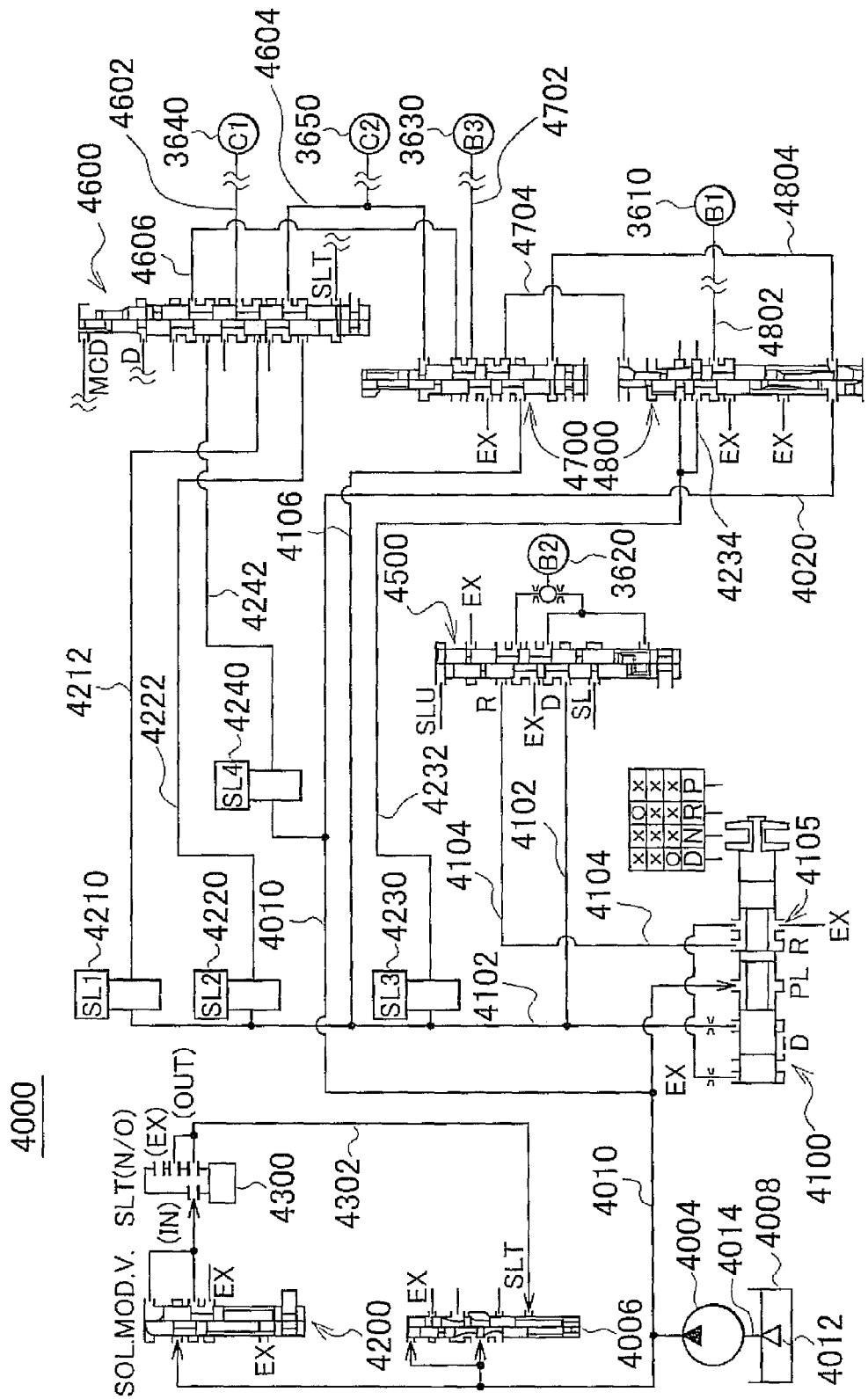
FIG. 4 is a view showing a part of a hydraulic circuit in the automatic transmission of the embodiment of FIG. 1.

Referring to FIG. 4, a principal part of the hydraulic circuit 4000 will be described. It is, however, to be understood that the hydraulic circuit 4000 is not limited to the one as described below.

The hydraulic circuit 4000 includes an oil pump 4004, primary regulator valve 4006, manual valve 4100, solenoid modulator valve 4200, SL1 linear solenoid (which will be referred to as "SL(1)") 4210, SL2 linear solenoid (which will be referred to as "SL(2)") 4220, SL3 linear solenoid (which will be referred to as "SL(3)") 4230, SL4 linear solenoid (which will be referred to as "SL(4)") 4240, SLT linear solenoid (which will be referred to as "SLT") 4300, B2 control valve 4500, sequence valve 4600, clutch apply control valve 4700, and a B1 apply control valve 4800.

A hydraulic pressure source of the automatic transmission 2000 includes an oil pan 4800 in which a hydraulic fluid (ATF (Automatic Transmission Fluid)) of the automatic transmission is stored, an oil pump 4004 operable to supply the hydraulic fluid stored in the oil pan 4008 to each friction device, using the power of the engine 1000, and a flow path 4014 through which the hydraulic fluid in the oil pan 4008 flows into the oil pump 4004.

The oil pump 4004 is connected to a pump impeller of the torque converter 3200. Namely, the oil pump 4004 is connected to the crankshaft of the engine 1000. Accordingly, the oil pump 4004 is driven in accordance with rotation of the crankshaft of the engine 1000, to suck up the hydraulic fluid in the oil pan 4008 via the flow path 4014, so that the hydraulic fluid is fed under pressure into the hydraulic circuit 4000 to generate a hydraulic pressure. Also, a strainer 4012 is provided at an end portion of the flow path 4014 which faces the oil pan 4008.

The hydraulic pressure generated by the oil pump 4004 is regulated by the primary regulator valve 4006, to produce a line pressure.

The primary regulator valve 4006 operates to produce the line pressure, using a throttle pressure fed from the SLT 4300 as a pilot pressure. The line pressure is supplied to the manual valve 4100 and the SL(4) 4240 via a line pressure oil path 4010.

The manual valve 4100 includes a drain port 4105. Hydraulic pressures of a D-range pressure oil path 4102 and a R-range pressure oil path 4104 are discharged from the drain port 4105. When a spool of the manual valve 4100 is in a D position, the line pressure oil path 4010 and the D-range pressure oil path 4102 are brought into communication with each other, and the hydraulic pressure (line pressure) is supplied to the D-range pressure oil path 4102. At this time, the R-range pressure oil path 4104 and the drain port 4105 are brought into communication with each other, and the R-range pressure of the R-range pressure oil path 4104 is discharged from the drain port 4105.

When the spool of the manual valve 4100 is placed in a R position, the line-pressure oil path 4010 and the R-range pressure oil path 4104 are brought into communication with each other, and the hydraulic pressure (line pressure) is supplied to the R-range pressure oil path 4104. At this time, the D-range pressure oil path 4102 and the drain port 4105 are bought into communication with each other, and the hydraulic fluid in the D-range pressure oil path 4102 is discharged from the drain port 4105.

When the spool of the manual valve 4100 is placed in a N position, both of the D-range pressure oil path 4102 and the R-range pressure oil path 4104 are brought into communication with the drain port 4105, and the D-range pressure of the D-range pressure oil path 4102 and the hydraulic fluid in the R-range pressure oil path 4104 are discharged from the drain port 4105.

The hydraulic pressure supplied to the D-range pressure oil path 4102 (which may also be called "D-range pressure") is supplied to the SL(1) 4210, SL(2) 4220, SL(3) 4230, and to the clutch apply control valve 4700 via an oil path 4106. The D-range pressure is eventually supplied to the B1 brake 3610, B2 brake 3620, C1 clutch 3640 and C2 clutch 3650. The R-range pressure is eventually supplied to the B2 brake 3620.

The solenoid modulator valve 4200 regulates the hydraulic pressure (solenoid modulator pressure) to be supplied to the SLT 4300, to a constant pressure, using the line pressure as an original pressure.

The SLT 4300 regulates the solenoid modulator pressure, according to a control signal from the ECU 8000 based on the amount of depression of the accelerator pedal detected by the acceleration stroke sensor 8010, so as to produce a throttle pressure. The throttle pressure is supplied to the primary regulator valve 4006 via a SLT oil path 4302. The throttle pressure is used as a pilot pressure for the primary regulator valve 4006.

The B2 control valve 4500 supplies a hydraulic pressure from a selected one of the D-range pressure oil path 4102 and the R-range pressure oil path 4104, to the B2 brake 3620. The D-range pressure oil path 4102 and the R-range pressure oil path 4104 are connected to the B2 control valve 4500. The B2 control valve 4500 is controlled under hydraulic pressures supplied from a SL solenoid valve (not shown) and a SLU solenoid valve (not shown) and the bias force of a spring.

When the SL solenoid valve is off, and the SLU solenoid valve is on, the B2 control valve 4500 is placed in the left-side state as shown in FIG. 4. In this case, the B2 control valve 4500 regulates the D-range pressure, using the hydraulic pressure supplied from the SLU solenoid valve as a pilot pressure, and supplies the thus regulated pressure to the B2 brake 3620.

When the SL solenoid valve is on, and the SLU solenoid valve is off, the B2 control valve 4500 is placed in the right-side state as shown in FIG. 4. In this case, the R-range pressure is supplied to the B2 brake 3620.

The SL(1) 4210 regulates a hydraulic pressure to be supplied to the C1 clutch 3640 via the sequence valve 4600. The SL(2) 4220 regulates a hydraulic pressure to be supplied to the C2 clutch 3650 via the sequence valve 4600. The SL(3) 4230 regulates a hydraulic pressure to be supplied to the B1 brake 3610 via the B1 apply control valve 4800. The SL(4) 4240 regulates a hydraulic pressure to be supplied to the B3 brake 3630 via the sequence valve 4600 and the clutch apply control valve 4700.

The SL(1) 4210, SL(2) 4220, SL(3) 4230, SL(4) 4240 and SLT 4300 are controlled according to control signals transmitted from the ECU 8000.

The SL(1) 4210 and the sequence valve 4600 are connected by an oil path 4212, and the SL(2) 4220 and the sequence valve 4600 are connected by an oil path 4222, while the SL(4) 4240 and the sequence valve 4600 are connected by an oil path 4242.

The sequence valve 4600 is controlled under the hydraulic pressure supplied from the SLT 4300 and the solenoid modulator valve 4200 and the bias force of a spring.

When the spool of the manual valve 4100 is in the D position, the sequence valve 4600, when it is in a normal condition, is placed in the right-side state as shown in FIG. 4. In this state, the oil path 4212 and an oil path 4602 connected to the C1 clutch 3640 are brought into communication with each other, and the oil path 4222 and an oil path 4604 connected to the C2 clutch 3650 are brought into communication with each other, while the oil path 4242 and an oil path 4606 connected to the clutch apply control valve 4700 are brought into communication with each other. The oil path 4604 and the oil path 4606 are connected to the clutch apply control valve 4700.

In gear positions other than the fourth-speed gear position, the clutch apply control valve 4700 is placed in the right-side state as shown in FIG. 4. More specifically, the clutch apply control valve 4700 is controlled under the hydraulic pressure supplied from the oil path 4602 to an upper part of the spool, the hydraulic pressure supplied from the oil path 4604 to the upper part of the spool, and the line pressure passing through an oil path 4020 and the B1 apply control valve 4800 and supplied from an oil path 4804 to a lower part of the spool, and the bias force of a spring.

In the fourth-speed gear position, hydraulic pressures regulated by the SL(1) 4210 and the SL(2) 4220 are supplied to the C1 clutch 3640 and the C2 clutch 3650, so as to bring the C1 clutch 3640 and the C2 clutch 3650 into engaged states. At this time, the clutch apply control valve 4700 is brought into the left-side state as shown in FIG. 4, if the force applied to push down the spool based on the hydraulic pressures supplied from the oil path 4602 and the oil path 4604 to the upper part of the spool exceeds the resultant force based on the line pressure supplied to the lower part of the spool and the bias force of the spring.

When the clutch apply control valve 4700 is in the left-side state of FIG. 4, the oil path 4106 communicates with an oil path 4704 connected to an upper part of the spool of the B1 apply control valve 4800. Therefore, the D-range pressure is supplied to the upper part of the spool of the B1 apply control valve 4800, via the oil path 4106 and the oil path 4704.

In gear positions other than the forth-speed gear position, the hydraulic pressure regulated by the SL(1) 4210 or the SL(2) 4220 is supplied to a selected one of the C1 clutch 3640 and the C2 clutch 3650, so that the selected one of the C1 clutch 3640 and the C2 clutch 3650 is brought into an engaged state. At this time, in the clutch apply control valve 4700, the force applied to push down the spool based on the hydraulic pressures supplied from the oil path 4604 and the oil path 4606 to the upper part of the spool becomes smaller than the resulting force based on the line pressure supplied to the lower part of the spool and the bias force of the spring, so that the clutch apply control valve 4700 is brought into the right-side state as shown in FIG. 4. As a result, the oil path 4606 is brought into communication with an oil path 4702 connected to the B3 brake 3630.

The B1 apply control valve 4800 is controlled under a hydraulic pressure supplied from the oil path 4704 to the upper part of the spool, a hydraulic pressure supplied from the oil path 4020 that branches off from the oil path 4010 to the lower part of the spool, and a hydraulic pressure supplied from an oil path 4232 to the upper part of the spool, and the bias force of the spring.

When the hydraulic pressure is supplied to the oil path 4702 connected to the B3 brake 3630, the force applied to push down the spool of the B1 apply control valve 4800 based on the hydraulic pressure supplied to the upper part of the spool exceeds the resultant force based on the hydraulic pressure supplied to the lower part of the spool and the bias force of the spring. As a result, the B1 apply control valve 4800 is brought into the right-side state as shown in FIG. 4.

When the hydraulic pressure supplied to the oil path 4702 connected to the B3 brake 3630 is reduced, on the other hand, the force applied to push down the spool of the B1 apply control valve 4800 based on the hydraulic pressure supplied to the upper part of the spool becomes smaller than the resultant force based on the hydraulic pressure supplied to the lower part of the spool and the bias force of the spring. As a result, the B1 apply control valve 4800 is brought into the left-side state as shown in FIG. 4.

The SL(3) 4230 is connected to the B1 apply control valve 4800 via the oil path 4232. Also, an oil path 4234 that branches off from the oil path 4232 is connected to the B1 apply control valve 4800. When the B1 apply control valve 4800 is placed in the left-side state as shown in FIG. 4, the oil path 4232 and an oil path 4802 connected to the B1 brake 3610 are brought into communication with each other.

In the vehicle on which the automatic transmission 2000 constructed as described above is installed, shift control is executed by the ECU 8000. The ECU 8000 sets a gear position corresponding to running conditions of the vehicle, based on the throttle opening, the rotational speed NO of the output shaft (which will also be called "output shaft speed NO"), and a shift diagram.

In the shift diagram, upshift line and downshift line corresponding to each gear position are determined in advance by experiment, or the like, and set. The ECU 8000 specifies a position on the shift diagram based on the throttle opening and the output shaft speed NO. When the specified position crosses an upshift line corresponding to the currently established gear position, the ECU 8000 sets a gear position that is on the higher-speed side of the established gear position. If the specified position crosses a downshift line corresponding to the currently established gear position, the ECU 8000 sets a gear position that on the lower-speed side of the established gear position. The ECU 8000 carries out shift control when the set gear position is different from the currently established gear position.

The ECU 8000 determines the currently established gear position based on, for example, the ratio (i.e., speed ratio) between the turbine speed NT and the output shaft speed NO. The ECU 8000 transmits a hydraulic pressure control signal to the hydraulic circuit 4000, so as to exercise predetermined control on various solenoid valves explained above with reference to FIG. 4, thereby to change the combination of engaged and released friction devices, into the one corresponding to the gear position to be established after shifting.

The ECU 8000 may set the gear position using the amount of depression of the accelerator pedal in place of the throttle opening, and may set the gear position using the running speed of the vehicle in place of the output shaft speed NO.

In the vehicle on which the automatic transmission 2000 as described above is installed, if the suction amount of the hydraulic fluid from the strainer 4012 increases because of, for example, a high engine speed, and the oil level of the hydraulic fluid in the oil pan 4008 is lowered due to reduction in the amount of the fluid in the oil pan 4008, the strainer 4012 may be exposed to above the oil level, and air may be likely to be contained in the hydraulic fluid supplied from the oil pump 4004. Where the hydraulic fluid has a low temperature and thus has a high viscosity, in particular, the hydraulic fluid supplied from the oil pump 4004 is less likely to return to the oil pan 4008, and air may be more likely to be mixed into the hydraulic fluid. If air is present in the hydraulic fluid, a required hydraulic pressure cannot be supplied to the friction device(s) to be engaged to establish the set gear position of the automatic transmission 2000, and slipping may occur in the friction device(s).

In view of the above situation, when an execution condition that one of a plurality of gear positions set according to the running conditions of the vehicle is maintained AND the rotational speed of an input-side rotary shaft of the planetary gear unit 3000 is increased to be higher than the rotational speed corresponding to the set gear position, is satisfied, the ECU 8000 controls the vehicle so as to bring the vehicle from the running conditions under which the execution condition is satisfied, into running conditions that eliminate a state in which air is contained in the hydraulic fluid supplied from the oil pump 4004.

In this embodiment, the ECU 8000 controls the vehicle so that the rotational speed of the input-side rotary shaft of the planetary gear unit 3000 becomes lower than the rotational speed detected when the execution condition is satisfied. More specifically, when the execution condition is satisfied, the ECU 8000 controls the automatic transmission 2000 so as to shift the transmission from the gear position established when the execution condition is satisfied, to a higher-speed gear position than the established gear position. The ECU 8000 may also execute control of the engine 1000, in place of or in addition to the above control of the automatic transmission 2000, so that output toque of the engine 1000 is reduced to be smaller than output torque obtained when the execution condition is satisfied.

In this embodiment, the ECU 8000 may execute the vehicle control as described above, when the temperature of the hydraulic fluid is equal to or lower than a predetermined temperature, as well as when the execution condition is satisfied.

Figure 5:
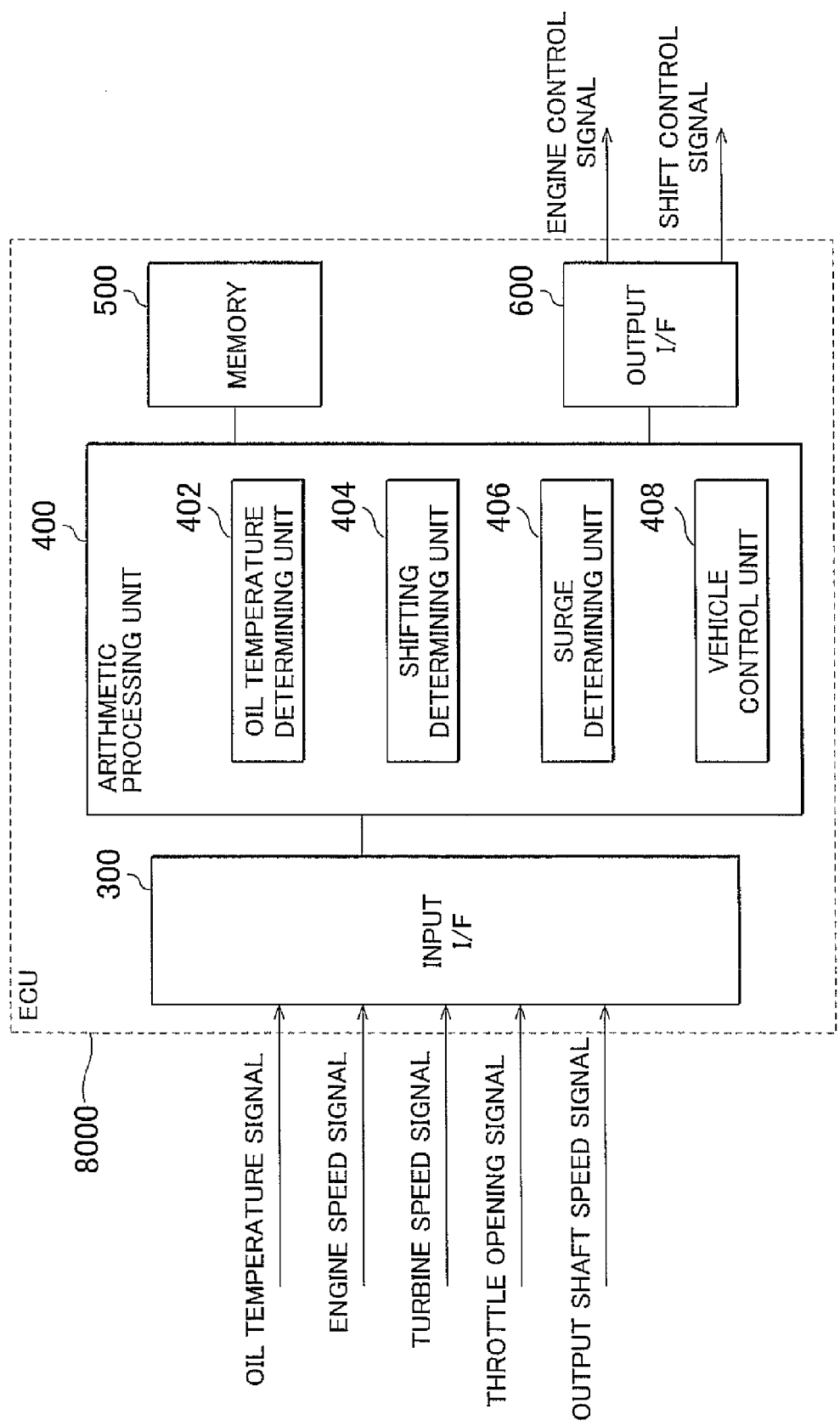
FIG. 5 is a functional block diagram of the ECU as the vehicle control system according to the embodiment of the invention.

FIG. 5 is a functional block diagram of the ECU 8000 as the vehicle control system according to this embodiment of the invention.

The ECU 8000 includes an input interface (hereinafter referred to as "input I/F") 300, an arithmetic processing unit 400, a memory 500, and an output interface (hereinafter referred to as "output I/F") 600.

The input I/F 300 receives an oil temperature signal from the oil temperature sensor 8026, an engine speed signal from the engine speed sensor 8020, a turbine speed signal from the input shaft speed sensor 8022, a throttle opening signal from the throttle position sensor 8018, and an output shaft speed signal from the output shaft speed sensor 8024, and transmits these signals to the arithmetic processing unit 400.

The arithmetic processing unit 400 includes an oil temperature determining unit 402, a shifting determining unit 404, a surge determining unit 406, and a vehicle control unit 408.

The oil temperature determining unit 402 determines whether the temperature of the hydraulic fluid based on the oil temperature signal is equal to or lower than a predetermined temperature. The predetermined temperature, which is determined by experiment, or like, is set at a level at which the hydraulic fluid has such a high viscosity that air is mixed into the hydraulic fluid. The oil temperature determining unit 402 may set an oil temperature determination flag to ON when the temperature of the hydraulic fluid is equal to or lower than the predetermined temperature, for example.

The shifting determining unit 404 determines whether the automatic transmission 2000 is in the process of shifting gears. The shifting determining unit 404 determines whether the automatic transmission 2000 is in the process of shifting gears, based on the throttle opening, the output shaft speed NO, and the shift diagram.

More specifically, the shifting determining unit 404 determines that the automatic transmission 2000 is in the process of shifting gears when the currently established gear position is different from the gear position set based on the throttle opening, output shaft speed NO and the shift diagram, such as when the position on the shift diagram which is specified based on the throttle opening and the output shaft speed NO crosses an upshift line or a downshift line. The shifting determining unit 404 determines that the automatic transmission 2000 is not in the process of shifting gears when the currently established gear position is kept being the same as the gear position set based on the throttle opening, output shaft speed NO and the shift diagram (until a predetermined time elapses, for example), since the position on the shift diagram which is specified based on the throttle opening and the output shaft speed NO does not cross any upshift line or downshift line.

The shifting determining unit 404 may set a shifting determination flag to ON when it determines that the automatic transmission 2000 is in the process of shifting gears.

When the automatic transmission 2000 is not in the process of shifting gears, and a difference between the turbine speed NT and the synchronous rotational speed corresponding to the currently established gear position is equal to or larger than a predetermined value, the surge determining unit 406 determines that a surge occurs in the engine speed or the turbine speed. The predetermined value, which is determined by experiment, or the like, is not particularly limited. The synchronous rotational speed corresponding to the gear position means a turbine speed calculated based on the output shaft speed NO and the gear ratio of the currently established gear position.

For example, the surge determining unit 406 may make a determination on the occurrence of a surge in the engine speed or the turbine speed NT when the oil temperature determination flag is ON and the shifting determination flag is OFF, and may set a surge determination flag to ON when it determines that a surge occurs in the engine speed or the turbine speed NT.

In this embodiment, when the surge determining unit 406 determines that a surge occurs in the engine speed or the turbine speed NT, the vehicle control unit 408 controls the vehicle so as to reduce the rotational speed of the input-side rotary shaft of the planetary gear unit 3000.

More specifically, the vehicle control unit 408 produces a shift control signal for shifting the automatic transmission 2000 into a higher-speed gear position than the currently established gear position, and transmits the signal to the automatic transmission 2000 via the output I/F 600. The vehicle control unit 408 may control the automatic transmission 2000 so as to establish a higher-speed gear position than the currently established gear position when the surge determination flag is ON.

In another example, when it is determined that a surge occurs in the engine speed or the turbine speed NT, the vehicle control unit 408 may produce an engine control signal for reducing the output torque of the engine 1000 to be smaller than that detected when the occurrence of a surge in the engine speed or turbine speed NT was determined, and may transmit the signal to the engine 1000 via the output I/F 600, in place of or in addition to the control exercised on the automatic transmission 2000. The output torque may be reduced by reducing the throttle opening, or retarding the fuel injection timing.

It is to be understood that the control executed by the vehicle control unit 408 is not limited to the control of the automatic transmission 2000 and the control of the engine 1000 as described above, but the vehicle control unit 408 may control the vehicle in any manner so as to reduce the rotational speed of the input-side rotary shaft of the planetary gear unit 3000, or suppress or prevent slipping of the friction devices.

In this embodiment, the oil temperature determining unit 402, shifting determining unit 404, surge determining unit 406 and the vehicle control unit 408 are explained as functions implemented via software, namely, functions implemented when a CPU (Central Processing Unit) as the arithmetic processing unit 400 executes a program or programs stored in the memory 500. However, the above-indicated units 402, 404, 406, 408 may be implemented via hardware. The above-mentioned programs are recorded in a storage medium, which is installed on the vehicle.

The memory 500 stores various kinds of information, programs, threshold values, maps, and so forth, and the arithmetic processing unit 400 reads data from the memory 500 or stores data into the memory 500 as needed.

Figure 6:
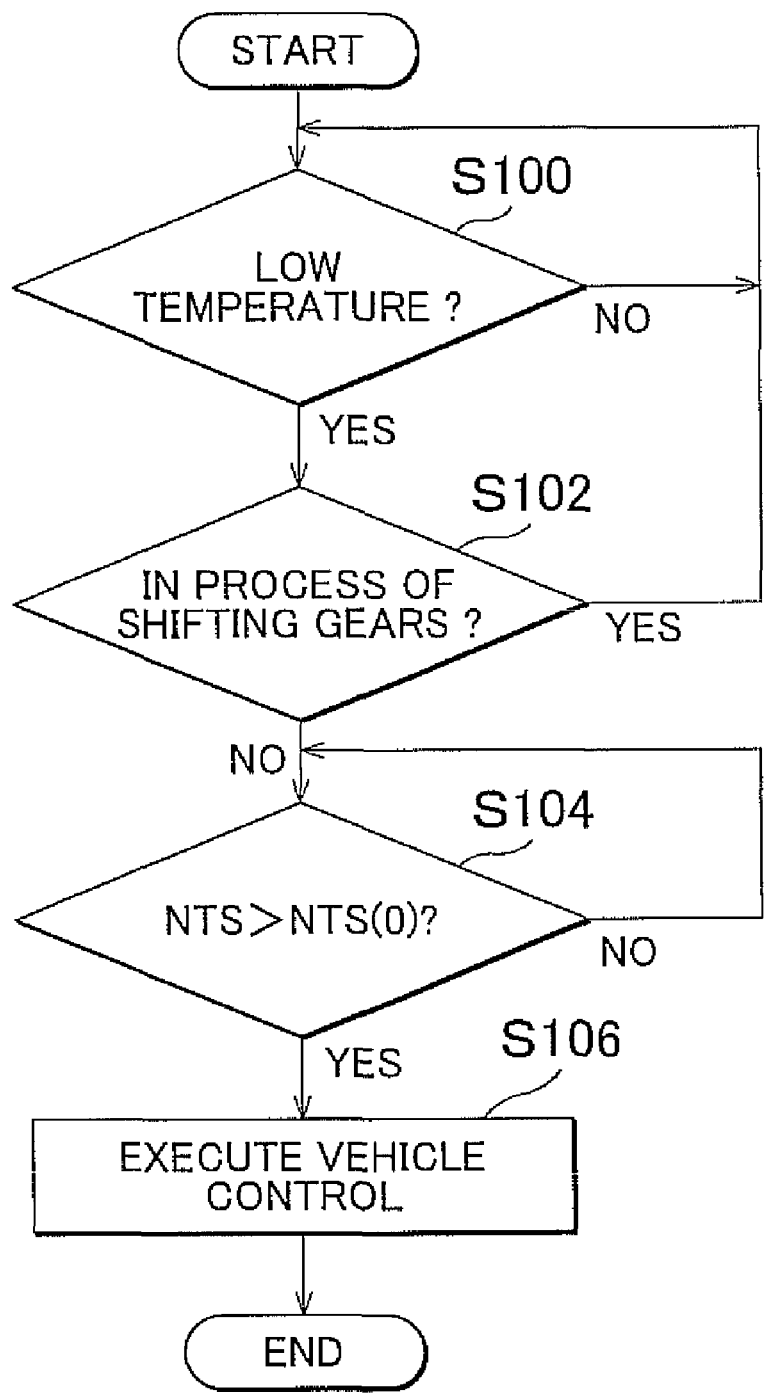
FIG. 6 is a flowchart illustrating a control scheme of a program executed by the ECU as the vehicle control system according to the embodiment of the invention.

Referring to FIG. 6, a control scheme of a program executed by the ECU 8000 as the vehicle control system according to this embodiment will be described.

The ECU 8000 determines in step (which will be abbreviated as "S") 100 whether the hydraulic fluid has a low temperature, i.e., a temperature equal to or lower than a predetermined temperature. If the temperature of the hydraulic fluid is low (YES in S100), the control proceeds to S102. If not (NO in S100), the control returns to S100.

In S102, the ECU 8000 determines whether the automatic transmission 2000 is in the process of shifting gears. If the automatic transmission 2000 is in the process of shifting gears (YES in S102), the control returns to S100.

In S104, the ECU 8000 determines whether a difference NTS between the turbine speed NT and the synchronous speed corresponding to the currently established gear position is larger than a predetermined value NTS(0). If NTS is larger than NTS(0) (YES in S104), the control proceeds to S106.

In S106, the ECU 8000 executes vehicle control. Namely, the ECU 800 executes shift control of the automatic transmission 2000 for upshifting the currently established gear position, or executes control for reducing the output torque of the engine 1000.

The operation of the ECU 8000 as the vehicle control system of this embodiment based on the configuration and flowchart as described above will be described with reference to FIG. 7 and FIG. 8.

Figure 7:
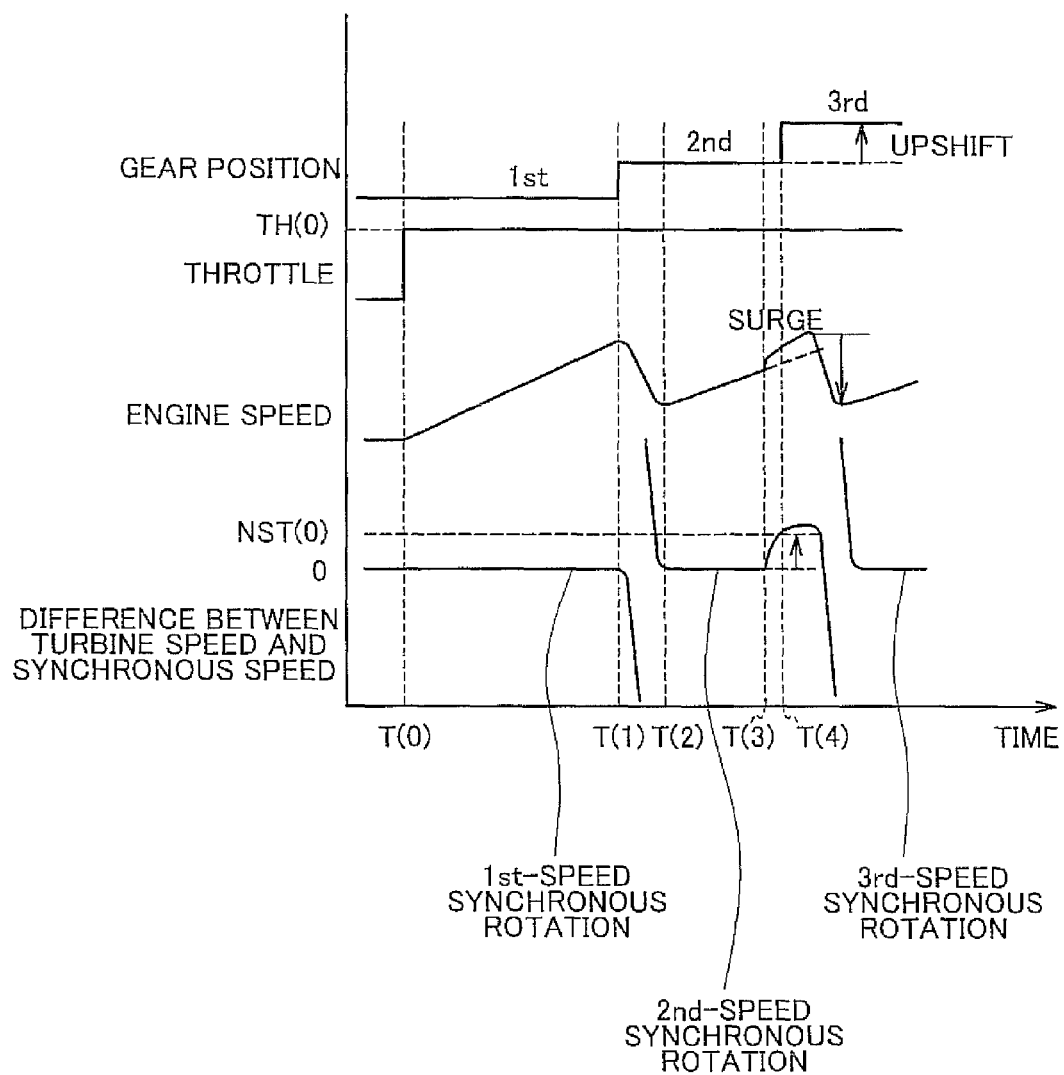
FIG. 7 is a timing chart (No. 1) illustrating the operation of the ECU as the vehicle control system according to the embodiment of the invention.

First, the case where the shift control of the automatic transmission 2000 is carried out will be explained with reference to FIG. 7. Suppose that the vehicle is started from a standstill, as shown in FIG. 7. At time T(0), the accelerator pedal is depressed by the driver, so that a first-speed gear position is established in which only the C1 clutch 3640 is engaged. Where the throttle opening is kept at TH(0), the engine speed increases with time. The vehicle speed (i.e., the rotational speed of the output shaft) increases with increase in the engine speed.

With the automatic transmission 2000 placed in the first-speed gear position, the turbine speed NT changes along with the synchronous speed corresponding to the first-speed gear position. Therefore, a difference between the turbine speed NT and the synchronous speed corresponding to the first-speed gear position is substantially zero.

If the position on the shift diagram which is specified based on the throttle opening and the output shaft speed NO crosses a first-to-second gear upshift line at time T(1), a second-speed gear position is set, and the automatic transmission 2000 starts being shifted into the second-speed gear position. Upon start of shifting into second gear, the ECU 8000 controls the hydraulic circuit 4000, so as to change a combination of engaged and released friction devices corresponding to the first-speed gear position, into a combination corresponding to the second-speed gear position.

More specifically, the hydraulic circuit 4000 is controlled so that the B1 brake 3610 is brought into an engaged state while the C1 clutch 3640 is held in the engaged state. The synchronous speed corresponding to the second-speed gear position is lower than the synchronous speed corresponding to the first-speed gear position. Therefore, as shifting into second gear proceeds, the turbine speed NT is reduced down to the synchronous speed corresponding to the set second-speed gear position, and the engine speed is reduced.

Once the combination of engaged and released friction devices has been changed, and the second-speed gear position is established at time T(2), the turbine speed NT changes along with the synchronous speed corresponding to the second-speed gear position. Therefore, a difference between the turbine speed NT and the synchronous speed corresponding to the second-speed gear position is substantially equal to zero at the time when the second-speed gear position is established.

If the hydraulic pressure applied to a friction device (the C1 clutch 3640 or the B1 brake 3610) decreases and the engaging force becomes weak at time T(3) due to the presence of air in the hydraulic fluid supplied to the automatic transmission 2000, slipping occurs in the friction device. As a result, the turbine speed NT increases to be higher than the synchronous speed corresponding to the currently established second-speed gear position.

If the difference between the turbine speed NT and the synchronous speed corresponding to the second-speed gear position becomes larger than NTS(0) (YES in S104) at time T(4), where the temperature of the hydraulic fluid is equal to or lower than the predetermined temperature (YES in S100) and the gear position set based on the throttle opening, output shaft speed NO and the shift diagram continues to be the second-speed gear position (YES in S104), a third-speed gear position as a higher-speed gear position than the second-speed gear position is set, and the automatic transmission 2000 starts being shifted into the third-speed gear position (S106).

Upon start of shifting into third gear, the ECU 8000 controls the hydraulic circuit 4000 so as to change the combination of engaged and released friction devices corresponding to the second-speed gear position, into a combination of engaged and released friction devices corresponding to the third-speed gear position.

More specifically, the hydraulic circuit 4000 is controlled so that, while the C1 clutch 3640 is held in the engaged state, the B1 brake 3610 is released, and the B3 brake 3630 is engaged. The synchronous speed corresponding to the third-speed gear position is lower than the synchronous speed corresponding to the second-speed gear position. Therefore, as shifting into third gear proceeds, the turbine speed NT is reduced down to the synchronous speed corresponding to the set third-speed gear position, and the engine speed is reduced.

Owing to the reduction of the engine speed, the amount of the hydraulic fluid sucked into the oil pump 4004 is reduced. Therefore, the amount of the hydraulic fluid drawn from the oil pan 4008 is reduced. As a result, a sufficient amount of hydraulic fluid whose oil level is high enough to keep air from being mixed into the hydraulic fluid is stored in the oil pan 4008, and thus the mixing of air into the hydraulic fluid can be eliminated or prevented.

Figure 8:
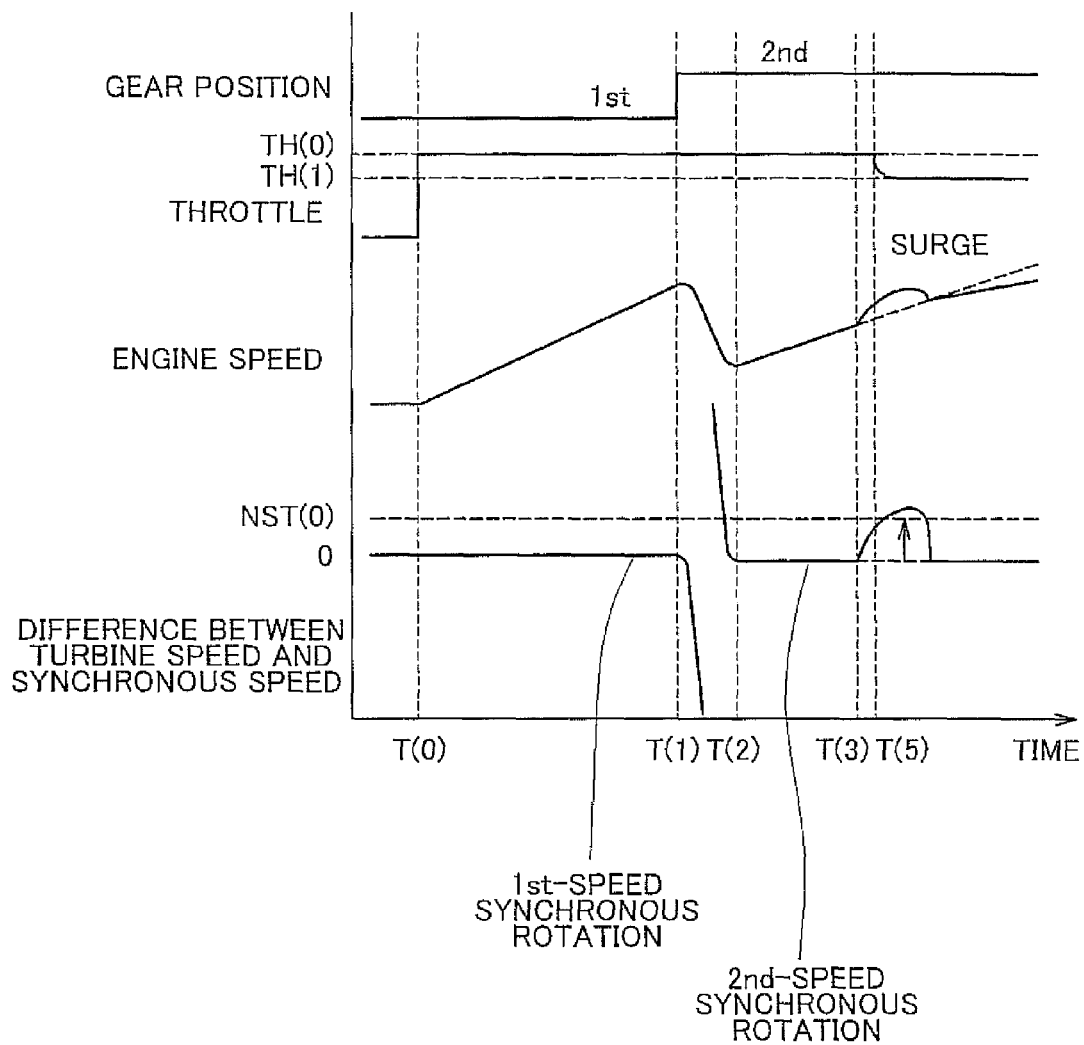
FIG. 8 is a timing chart (No. 2) illustrating the operation of the ECU as the vehicle control system according to the embodiment of the invention.

Next, the case where the control for reducing the output torque of the engine 1000 is carried out will be explained with reference to FIG. 8. The operation of the ECU 8000 during a period from time T(0) to time T(3) in FIG. 8 is substantially the same as the operation of the ECU 8000 during a period from time T(0) to time T(3). Therefore, detailed description of the operation during this period will not be repeated.

If the difference NTS between the turbine speed NT and the synchronous speed corresponding to the second-speed gear position becomes larger than NTS(0) at time T(5) (YES in S104), where the temperature of the hydraulic fluid is equal to or lower than the predetermined temperature (YES in S100), and the gear position set based on the throttle opening, output shaft speed NO and the shift diagram continues to be the second-speed gear position (YES in S104), the throttle opening is reduced from TH(0) to TH(1) that is smaller than TH(0).

If the throttle opening is reduced from TH(0) to TH(1), the output torque of the engine 1000 is reduced. If the output torque of the engine 1000 is reduced, the power transmitted from the engine 1000 to the automatic transmission 2000 is reduced, whereby the degree of slipping of the friction device (C1 clutch 3640 or B1 brake 3610) is reduced.

Owing to the reduction in the degree of slipping of the friction device, a surge in the engine speed or turbine speed is suppressed or prevented, so that the amount of the hydraulic fluid sucked into the oil pump 4004 can be reduced to be lower than that detected when the control for reducing the output torque of the engine 1000 was started. Therefore, the amount of the hydraulic fluid drawn from the oil pan 4008 is reduced. As a result, a sufficient amount of hydraulic fluid whose oil level is high enough to keep air from being mixed into the hydraulic fluid is stored in the oil pan 4008, and thus the mixing of air into the hydraulic fluid can be eliminated or prevented.

While the control of the automatic transmission 2000 and the control of the engine 1000 are individually carried out in the embodiment as described above, both of the control of the automatic transmission 2000 and the control of the engine 1000 may be carried out.

With the above-described arrangement of the vehicle control system according to this embodiment, when the execution condition is satisfied, control of the automatic transmission or the engine is carried out so as to bring the vehicle from running conditions in which the execution condition is satisfied, into running conditions that will eliminate a state in which air is contained in the hydraulic fluid supplied from the oil pump, thereby to eliminate the state in which air is present in the hydraulic fluid and suppress or prevent slipping of the friction device(s). Since no means for detecting an exposed state of the strainer above the oil level of the hydraulic fluid is needed for execution of the above controls, there is no need to add a new constituent component for this purpose. Thus, the vehicle control system and control method are provided which eliminate the state in which air is present in hydraulic fluid in the automatic transmission, without requiring any additional component.

By controlling the automatic transmission so as to shift the transmission into a higher-speed gear position than the gear position established when the execution condition is satisfied, the rotational speed of the input-side rotary shaft of the shifting mechanism can be reduced, and the amount of the hydraulic fluid supplied from the oil pump can be reduced. Therefore, the oil level of the hydraulic oil in the oil pan is less likely to be lowered, and the state in which air is present in the hydraulic fluid in the automatic transmission can be eliminated.

By control the engine so as to reduce the output torque to be smaller than the output torque detected when the execution condition is satisfied, the torque transmitted to the automatic transmission is reduced, so that the degree of slipping of the friction device(s) can be reduced. With the output torque thus reduced, a surge in the engine speed or turbine speed is suppressed or prevented, and the rotational speed of the input-side rotary shaft of the shifting mechanism is reduced, so that the amount of the hydraulic fluid supplied from the oil pump can be reduced. Consequently, the oil level of the hydraulic oil in the oil pan is less likely to be lowered, and the state in which air is present in the hydraulic fluid in the automatic transmission can be eliminated.

In the illustrated embodiment, the shift control of the automatic transmission and the control for reducing the output torque of the engine are carried out when the difference between the turbine speed and the synchronous speed corresponding to the set gear position is equal to or larger than the predetermined value. However, the shift control and the control of the engine may be carried out when a difference between the engine speed and a synchronous speed corresponding to the set gear position is equal to or larger than a predetermined value.

It is to be understood that the illustrated embodiment is not limiting the scope of the invention but exemplary in all respects. The scope of the invention is not determined by the above description of the embodiment but is defined by the appended claims, and is intended to include all changes or modifications within the meanings and scopes equivalent to the claims.

What is claimed is:

1. A control system of a vehicle including an engine, and an automatic transmission operable to establish a gear position selected from a plurality of gear positions, according to running conditions of the vehicle, by changing engaged or released states of friction devices using a hydraulic pressure supplied from a hydraulic pressure source, said automatic transmission including a fluid coupling having an input shaft coupled to the engine and a shifting mechanism having an input shaft coupled to the fluid coupling, said hydraulic pressure source including a reservoir in which a hydraulic fluid is stored, a supply device that supplies the hydraulic fluid stored in the reservoir to the friction devices, using power of the engine, and a flow path through which the hydraulic fluid stored in the reservoir flows into the supply device, said control system comprising:
a rotational speed detector configured to detect a rotational speed of an input-side rotary shaft of the shifting mechanism; and
a controller configured to control the vehicle so that, when an execution condition that a selected one of said plurality of gear positions set according to the running conditions of the vehicle is maintained, and the rotational speed of the input-side rotary shaft has increased to be higher than a rotational speed corresponding to the set gear position, is satisfied, the vehicle is brought from running conditions under which the execution condition is satisfied, into running conditions that will eliminate a state in which air is present in the hydraulic fluid supplied from the supply device.

2. The control system of the vehicle according to claim 1, wherein the controller controls the vehicle so that the rotational speed of the input-side rotary shaft of the shifting mechanism is reduced to be lower than a rotational speed thereof detected when the execution condition is satisfied.

3. The control system of the vehicle according to claim 2, wherein the controller controls the automatic transmission so that the automatic transmission is shifted into a higher-speed gear position than the gear position established when the execution condition is satisfied.

4. The control system of the vehicle according to claim 1, wherein the controller controls the engine so that output torque of the engine is reduced to be smaller than output torque detected when the execution condition is satisfied.

5. The control system of the vehicle according to claim 1, wherein the execution condition comprises a condition that the selected one of said plurality of gear positions set according to the running conditions of the vehicle is maintained, and the rotational speed of the input shaft of the shifting mechanism is higher by a predetermined value or greater than a synchronous rotational speed corresponding to the set gear position and a rotational speed of an output shaft of the shifting mechanism.

6. The control system of the vehicle according to claim 1, wherein the execution condition comprises a condition that the selected one of said plurality of gear positions set according to the running conditions of the vehicle is maintained, and the rotational speed of the engine is higher by a predetermined value or greater than a synchronous rotational speed corresponding to the set gear position and a rotational speed of an output shaft of the shifting mechanism.

7. The control system of the vehicle according to claim 1, further comprising a temperature detector configured to detect a temperature of the hydraulic fluid in the automatic transmission, wherein
the controller controls the vehicle so that, when the execution condition is satisfied, and the temperature of the hydraulic fluid is equal to or lower than a predetermined temperature, the vehicle is brought into running conditions that will eliminate the state in which air is present in the hydraulic fluid supplied from the supply device.

8. A method of controlling a vehicle including an engine, and an automatic transmission operable to establish a gear position selected from a plurality of gear positions, according to running conditions of the vehicle, by changing engaged or released states of friction devices using a hydraulic pressure supplied from a hydraulic pressure source, said automatic transmission including a fluid coupling having an input shaft coupled to the engine and a shifting mechanism having an input shaft coupled to the fluid coupling, said hydraulic pressure source including a reservoir in which a hydraulic fluid is stored, a supply device that supplies the hydraulic fluid stored in the reservoir to the friction devices, using power of the engine, and a flow path through which the hydraulic fluid stored in the reservoir flows into the supply device, said method comprising:
detecting a rotational speed of an input-side rotary shaft of the shifting mechanism; and controlling the vehicle so that, when an execution condition that a selected one of said plurality of gear positions set according to the running conditions of the vehicle is maintained, and the rotational speed of the input-side rotary shaft has increased to be higher than a rotational speed corresponding to the set gear position, is satisfied, the vehicle is brought from running conditions under which the execution condition is satisfied, into running conditions that will eliminate a state in which air is present in the hydraulic fluid supplied from the supply device.

9. The method of controlling the vehicle according to claim 8, wherein the vehicle is controlled so that the rotational speed of the input-side rotary shaft of the shifting mechanism is reduced to be lower than a rotational speed detected when the execution condition is satisfied.

10. The method of controlling the vehicle according to claim 9, wherein the automatic transmission is controlled so as to be shifted into a higher-speed gear position than the gear position established when the execution condition is satisfied.

11. The method of controlling the vehicle according to claim 8, wherein the engine is controlled so that output torque of the engine is reduced to be smaller than output torque detected when the execution condition is satisfied.

12. The method of controlling the vehicle according to claim 8, wherein the execution condition comprises a condition that the selected one of said plurality of gear positions set according to the running conditions of the vehicle is maintained, and the rotational speed of the input shaft of the shifting mechanism is higher by a predetermined value or greater than a synchronous rotational speed corresponding to the set gear position and a rotational speed of an output shaft of the shifting mechanism.

13. The method of controlling the vehicle according to claim 8, wherein the execution condition comprises a condition that the selected one of said plurality of gear positions set according to the running conditions of the vehicle is maintained, and the rotational speed of the engine is higher by a predetermined value or greater than a synchronous rotational speed corresponding to the set gear position and a rotational speed of an output shaft of the shifting mechanism.

14. The method of controlling the vehicle according to claim 8 further comprising detecting a temperature of the hydraulic fluid in the automatic transmission, wherein
the vehicle is controlled so that, when the execution condition is satisfied, and the temperature of the hydraulic fluid is equal to or lower than a predetermined temperature, the vehicle is brought into running conditions that will eliminate the state in which air is present in the hydraulic fluid supplied from the supply device.

* * * * *